United States Patent
Ferro

(10) Patent No.: US 8,155,803 B2
(45) Date of Patent: *Apr. 10, 2012

(54) DEVICE AND METHOD FOR ASSISTING IN THE MANAGEMENT OF AN ENGINE FAILURE ON AN AIRCRAFT

(75) Inventor: Daniel Ferro, Muret (FR)

(73) Assignee: Airbus Operations SAS, Toulouse (FR)

( * ) Notice: Subject to any disclaimer, the term of this patent is extended or adjusted under 35 U.S.C. 154(b) by 1101 days.

This patent is subject to a terminal disclaimer.

(21) Appl. No.: 12/026,494

(22) Filed: Feb. 5, 2008

(65) Prior Publication Data
US 2008/0243315 A1    Oct. 2, 2008

(30) Foreign Application Priority Data
Feb. 7, 2007   (FR) ..................... 07 00862

(51) Int. Cl.
G05D 1/08    (2006.01)
G08B 21/00   (2006.01)
(52) U.S. Cl. .......................... 701/7; 340/945
(58) Field of Classification Search .............. 701/1, 3, 701/7, 14, 16, 120; 340/945
See application file for complete search history.

(56) References Cited

U.S. PATENT DOCUMENTS

| | | | |
|---|---|---|---|
| 4,538,229 A * | 8/1985 | Baltzer et al. ............ 701/16 |
| 4,964,599 A | 10/1990 | Farineau | |
| 5,526,265 A * | 6/1996 | Nakhla ..................... 701/16 |
| 5,574,647 A * | 11/1996 | Liden ........................ 701/8 |
| 5,842,142 A * | 11/1998 | Murray et al. ........... 701/16 |
| 6,038,498 A * | 3/2000 | Briffe et al. ............... 701/3 |
| 6,134,500 A * | 10/2000 | Tang et al. .............. 701/202 |
| 6,317,680 B1 * | 11/2001 | Luttrell et al. .......... 701/104 |
| 6,352,223 B1 | 3/2002 | Larramendy | |
| 6,629,023 B1 * | 9/2003 | Silder et al. ............. 701/16 |
| 6,880,784 B1 | 4/2005 | Wilkinson | |
| 6,980,892 B1 * | 12/2005 | Chen et al. ............... 701/9 |
| 7,212,917 B2 * | 5/2007 | Wilson, Jr ............. 701/120 |
| 7,382,287 B1 * | 6/2008 | Chen et al. ............. 340/972 |
| 7,584,046 B2 * | 9/2009 | Deker ..................... 701/120 |
| 7,765,036 B2 * | 7/2010 | Bouchet ................... 701/3 |
| 7,797,102 B2 * | 9/2010 | Fortier ................... 701/206 |
| 7,874,521 B2 * | 1/2011 | Shuster .................. 244/175 |
| 2004/0078136 A1 * | 4/2004 | Cornell et al. ......... 701/120 |
| 2005/0021212 A1 | 1/2005 | Gayme | |

(Continued)

FOREIGN PATENT DOCUMENTS

EP    1 677 172    7/2006

(Continued)

OTHER PUBLICATIONS

Preliminary Search Report dated Nov. 22, 2007.

*Primary Examiner* — James Trammell
*Assistant Examiner* — Majdi Alsomiri
(74) *Attorney, Agent, or Firm* — Dickinson Wright PLLC

(57) ABSTRACT

A device and method for assisting in the management of an engine failure on an aircraft. The device automatically determines when an engine failure is detected, vectoring settings including speed, thrust and altitude settings designed to be implemented on the aircraft in such a manner as to allow it to fly to a particular airport.

9 Claims, 2 Drawing Sheets

U.S. PATENT DOCUMENTS

| | | |
|---|---|---|
| 2005/0194494 A1 | 9/2005 | MacDougall |
| 2005/0261811 A1* | 11/2005 | Artini et al. ............... 701/3 |
| 2006/0015247 A1* | 1/2006 | Speer ............... 701/206 |
| 2006/0142976 A1 | 6/2006 | Bonanni |
| 2006/0273928 A1* | 12/2006 | Van Boven ............... 340/945 |
| 2007/0129855 A1* | 6/2007 | Coulmeau ............... 701/3 |
| 2008/0065352 A1* | 3/2008 | Coulmeau ............... 702/175 |
| 2008/0177432 A1* | 7/2008 | Deker et al. ............... 701/17 |
| 2008/0215196 A1* | 9/2008 | Deker ............... 701/5 |
| 2009/0132106 A1* | 5/2009 | DeJonge ............... 701/15 |

FOREIGN PATENT DOCUMENTS

| | | |
|---|---|---|
| FR | 2 617 120 | 12/1988 |
| FR | 2 789 500 | 8/2000 |

* cited by examiner

DEVICE AND METHOD FOR ASSISTING IN THE MANAGEMENT OF AN ENGINE FAILURE ON AN AIRCRAFT

FIELD OF THE INVENTION

The present invention relates to a method and a device for assisting in the management of an engine failure on a multi-engine aircraft, in particular of a multi-motor transport plane.

BACKGROUND OF THE RELATED ART

It is known that the occurrence, during the flight of a transport plane, of a failure of one of its engines demands that the flight crew react quickly in order to ensure its safety in the short-term (control of the thrust control and of the instantaneous trajectory), then define the procedure to be followed in the longer term. The latter may consist in:
  continuing the flight, if necessary at a lower altitude; or
  returning to the departure airport; or
  diverting to an alternate airport.

The operations control center of each airline prepares a flight folder for each flight. This flight folder could include fall-back trajectories in case of engine failure. Such a fall-back trajectory is actually obligatory for air operations referred to as "ETOPS" (Extended Twin-engine Operations) that cover twin-engine flights of which at least a portion is at over one hour flying time from any airport.

When an engine failure occurs, in addition to dealing with the failure itself (shutdown defective engine, etc.), the flight crew must carry out a certain number of relatively complex tasks:
  adapt the thrust on the engine or engines that remain available;
  communicate with the air traffic controllers;
  define the destination (which could be a new one) and input it into the flight management processor, for example of the FMS (Flight Management System) type, together with the trajectory for flying to this destination;
  define the flight strategy in the vertical plane according to the environment, in other words:
    choose the climb or descent slope, then the new flight level;
    choose the new speed profile; and
  ensure that the aircraft performance parameters (which, with one less engine, systematically over-consume fuel) will allow the chosen destination to be reached.

As a result, the occurrence of an engine failure leads to a significant increase in the workload of the flight crew of the plane.

A system is known from the document FR-2 789 500 that comprises means capable of detecting any engine failure of a multi-engine aircraft and that allows the yaw control of the aircraft to be improved when an engine failure is detected. This system is based on the enhancement of an electrical flight control system described in the document FR-2 617 120.

It also known that many flights go through portions of airspace for which the notion of invariable airway does not apply. This is in particular the case above oceanic regions, for which substantially parallel routes are constructed by countries and defined on a daily basis as a function of the weather conditions and of the traffic requests presented by the airlines by means of a system called OTS (Organized Track System). For each of these routes, the aircraft may be separated:
  vertically: every 2000 feet (around 600 meters) for example; and
  longitudinally (for the same flight level): generally every 10 minutes as a minimum.

When an engine failure occurs while the aircraft is situated on one of these routes which are, in general, laterally separated by 60 nautical miles (around 110 km), it is recommended to move away reasonably quickly from the planned route. The reason for this is that, owing to the loss of altitude induced by the engine failure, there is a non-negligible risk of coming into conflict with an aircraft flying under this route. It is generally accepted that the best strategy consists in turning by 90° and taking the aircraft to an intermediate lateral route.

The occurrence of an in-flight engine failure therefore constitutes one of the most critical cases in aeronautics. It very often causes anxiety and stress for the pilots, in addition to a significant increase in the workload, as previously indicated. On top of that must be added the fact that the aircraft must clear obstacles due to mountainous terrain (more critical because the flight ceiling decreases owing to the engine failure) and that, in the case where only one engine remains in operation, draconian regulations limit the flight time (for single-engine operation).

The procedures to be implemented by the crew in such a situation are therefore time-consuming and complex, and as a result open the door, in a stressful situation, to errors, confusion, forgetfulness, etc.

SUMMARY OF THE INVENTION

The present invention relates to a method for assisting in the management of an engine failure of a multi-engine aircraft, in particular a multi-engine transport plane, that allows the aforementioned drawbacks to be overcome.

For this purpose, according to the invention, said method, according to which the engines on said aircraft are monitored during a flight in such a manner as to be able to detect any engine failure, is noteworthy in that, when an engine failure is detected during a flight, the following series of successive steps are automatically carried out:
a) the current values of parameters relating to the flight conditions of the aircraft, together with the values of basic parameters of the aircraft, are determined;
b) a flight strategy is defined that is designed to be applied to the aircraft for flying to a destination airport;
c) using said values determined in step a) and said flight strategy, vectoring settings comprising speed, thrust and altitude settings are determined that are designed to be implemented on the aircraft so as to allow it to fly to said destination airport; and
a) the speed, thrust and altitude settings thus determined are transmitted to a system (comprising, for example, an auto-pilot and an auto-throttle) allowing them to be automatically implemented on the aircraft.

Thus, thanks to the invention, when an engine failure is detected, vectoring settings comprising speed, thrust and altitude settings are determined which allow the aircraft, when they are applied to it, to fly to a destination airport (initially planned arrival airport, departure airport and/or diversion airport). This allows the workload of the flight crew, and notably of the pilot, to be considerably reduced, and also allows his stress, in such a situation which is particularly critical, to be reduced.

The method according to the present invention therefore provides a valuable assistance in the management of an engine failure on a multi-engine aircraft.

The present invention is more particularly applicable to climbing, cruising and descent phases, as indicated hereinbelow.

In one particular embodiment:
  said parameters relating to the flight conditions comprise at least the speed and the altitude of the aircraft; and/or
  said basic parameters comprise at least the mass and the type of the aircraft and the external temperature.

Furthermore, advantageously, said flight strategy is a strategy selected by an operator and, where there is no selection, a default strategy, in particular an obstacle clearance strategy indicated hereinafter, which is conservative from the point of view of the short-term safety. Preferably, at step b), one of the following flight strategies is received:
  a standard strategy consisting in flying the aircraft so as to minimize the fuel consumption;
  a strategy with minimum flight time consisting in flying the aircraft at the highest possible speed; and
  an obstacle clearance strategy consisting in flying the aircraft as high as possible.

Furthermore, advantageously, at step d), only the vectoring settings are transmitted that have been validated beforehand using a validation means which is capable of being actuated by an operator, in particular the pilot of the aircraft. This allows the pilot to remain in control of the maneuver implemented as a result of an engine failure.

Furthermore, advantageously, at step c), in order to determine said vectoring settings allowing the aircraft to fly to said destination airport, the following operations are carried out:
  c1) an altitude is calculated which is characteristic of the flight strategy in question;
  c2) at least one speed parameter is calculated which is also characteristic of said flight strategy;
  c3) the effective altitude of the aircraft when the engine failure occurs is compared with the said altitude which is characteristic of the flight strategy and, depending on the result of this comparison, first speed, thrust and altitude settings allowing the aircraft to reach said characteristic altitude are determined;
  c4) preferably when the aircraft has reached this characteristic altitude, using said speed parameter, second speed, thrust and altitude settings are determined that allow the aircraft to follow a cruising flight at said characteristic altitude toward said destination airport; and
  c5) preferably when the aircraft is situated at a pre-determined distance from the destination airport, third speed, thrust and altitude settings are determined that allow the aircraft to descend in order to land at said destination airport,
said first, second and third speed, thrust and altitude settings forming said vectoring settings.

The present invention also relates to a device for assisting in the management of an engine failure on a multi-engine aircraft, in particular a multi-engine transport plane.

For this purpose, according to the invention, said device of the type comprising first means capable of automatically detecting, during a flight of the multi-engine aircraft, a failure of an engine of said aircraft, is noteworthy in that it additionally comprises:
  second means for automatically determining, when an engine failure is detected by said first means, the current values of parameters relating to the flight conditions of the aircraft, together with the values of basic parameters of the aircraft;
  third means for automatically generating a flight strategy designed to be applied to the aircraft for flying to a destination airport;
  fourth means for automatically determining, using said values received from said second means and said flight strategy received from said third means, vectoring settings comprising speed, thrust and altitude settings designed to be implemented on the aircraft so as to allow it to fly to said destination airport; and
  fifth means for automatically transmitting said speed, thrust and altitude settings to a system allowing them to be automatically implemented on the aircraft.

Furthermore, in one particular embodiment, said device additionally comprises:
  selection means allowing an operator to select a flight strategy; and/or
  said system (comprising, for example, an auto-pilot and/or an auto-throttle) allowing said speed, thrust and altitude settings to be automatically implemented.

BRIEF DESCRIPTION OF THE DRAWINGS

The figures of the appended drawing will clearly explain how the invention may be embodied. In these figures, identical references denote similar elements.

DETAILED DESCRIPTION OF THE INVENTION

Figure 1:
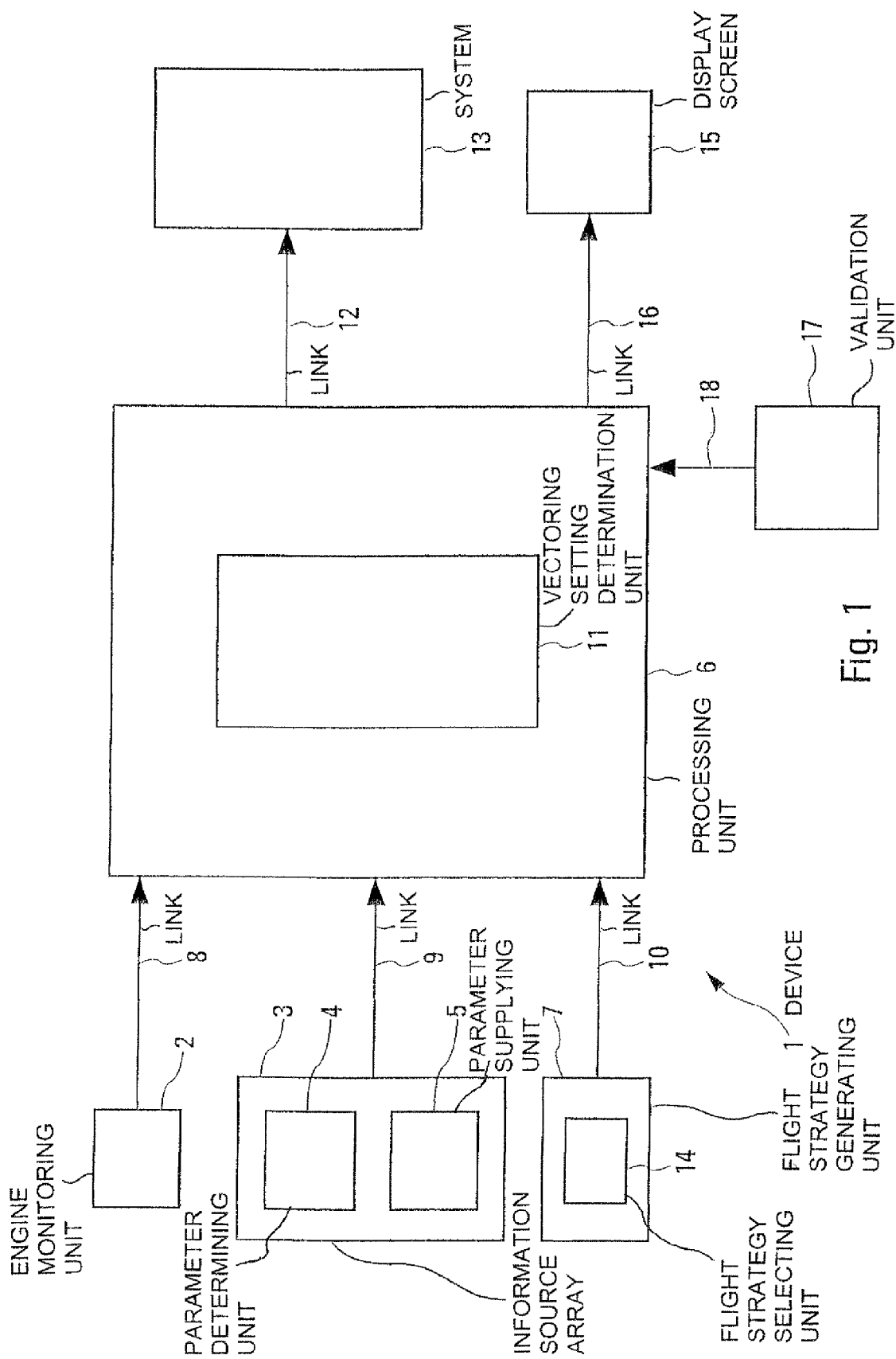
FIG. 1 is a block diagram of a device according to the invention.

The device 1 according to the invention and shown schematically in FIG. 1 is designed to assist the flight crew of a multi-engine aircraft A, in particular of a multi-engine transport plane, in managing an engine failure.

For this purpose, this device 1 notably comprises means 2 that monitor the various engines of the aircraft A and that are capable of automatically detecting, in a usual manner, during a flight of the aircraft A, any failure of any one of said engines (not shown).

According to the invention, said device 1 additionally comprises:
  an array 3 of sources of information which notably comprise:
    means 4 for automatically determining, when an engine failure is detected by said means 2, the current values of parameters relating to the flight conditions of the aircraft A. These parameters comprise at least the speed and the altitude of said aircraft A; and
    means 5, for example an information database, that supply the values of basic parameters of the aircraft A, such as the mass and notably the type of this aircraft A or the external temperature;
  means 7 that are capable of generating a flight strategy (indicated hereinbelow) which allows the aircraft A, when the strategy is applied to it, to fly to a destination airport (initially planned arrival airport, departure airport or diversion airport). The selection of this destination airport is made in a usual manner;
  a processing unit 6 which is connected via links 8, 9 and 10 to said means 2, to said array 3 and to said means 7, respectively, and which comprises:
    integrated means (not shown) capable of receiving said values (current values and basic parameter values) and said flight strategy from said array 3 and from said means 7, respectively;
    means 11 which are formed in such a manner as to automatically determine, using said current values, said basic parameter values and said flight strategy, vectoring settings comprising speed settings, thrust settings and altitude settings. These vectoring settings are designed to be implemented on the aircraft A (so as to allow it to fly to said destination airport); and integrated means (not shown) for automatically transmitting, via a link 12, the speed, thrust and altitude settings determined by said means 11 to a system 13 that allows them to be implemented on the aircraft A.

Thus, when an engine failure is detected, the device 1 automatically determines (in real time) vectoring settings comprising speed, thrust and altitude settings which allow the aircraft A, when they are applied to it, to fly to a destination airport (initially planned arrival airport, the departure airport or diversion airport). This allows the workload of the flight crew, and notably of the pilot, to be considerably reduced, and also allows his stress, in such a situation which is particularly critical, to be reduced.

The device 1 according to the present invention therefore provides a valuable assistance in the management of an engine failure on a multi-engine aircraft A. This device 1 is more particularly applicable to climbing, cruising and descent phases, as indicated hereinabove.

In one particular embodiment, said device 1 also comprises the system 13 which can notably comprise a usual auto-pilot and/or a usual auto-throttle designed to control the thrust of the engines.

The means 7 comprise a means 14 allowing an operator, in particular the pilot of the aircraft A, to select a particular flight strategy from amongst a plurality of possible flight strategies. The flight strategy defines parameters (altitude, speed) in the vertical plane allowing a destination airport to be reached. The operator selects a particular flight strategy depending on the destination airport and on the type of flight. However, if there is no selection, or in the absence of selection means 13 on the device 1, when an engine failure occurs, said means 7 transmit a default flight strategy to the processing unit 6, which is for example stored in a database (not shown) of said means 7. Preferably, this default flight strategy is an obstacle clearance strategy (indicated hereinafter) which allows the altitude of the aircraft A to be maximized, while waiting for the flight crew to make a decision (which may take several minutes).

In a preferred embodiment, said means 7 preferably transmit, to the processing unit 6, one of the following strategies:

a standard strategy or LRC (Long-Range Cruise) strategy, which consists in flying the aircraft A while minimizing the fuel consumption. This standard strategy defines an LRC speed and an LRC ceiling (or LRC altitude). The flight level and the speed (or Mach number) are kept constant.

The descent toward a destination airport is carried out with a constant Mach number and speed, values which may be adapted depending on the type of aircraft A. In addition, a correction may be applied as a function of the mass of the aircraft A.

In this case, the compatibility of this standard strategy with the fuel consumption (a regulatory minimum fuel reserve must be available on arrival at the destination airport) and with respect to overflying obstacles should be verified. Generally speaking, the overfly margin must be at least equal to 1000 feet (around 300 meters) in level flight and to 2000 feet (around 600 meters) if the aircraft A is in descent;

a minimum flight time strategy (Min Time Strategy) which consists in flying the aircraft A at the highest possible speed, taking into account the maximum speed and/or Mach number with one engine inoperative. A constant high speed and Mach number, pre-defined according to the type of aircraft A, may be chosen. The maximum operating speed, or VMO (Velocity Max Operating) and the maximum operating Mach number, or MMO (Mach number Max Operating), which are constant, may also be systematically chosen.

The descent toward a destination airport is carried out with constant Mach number and speed, values which may be adapted according to the type of aircraft A. A correction may be applied as a function of the mass of the aircraft A.

In this case, the compatibility of this strategy with respect to the fuel consumption and with respect to overflying obstacles should also be verified; and an obstacle clearance strategy which consists in flying the aircraft A as high as possible, in particular at optimum slope speed with one engine shutdown, which is referred to as "Greendot" (or "Gdot") on airplanes of the AIRBUS type.

The descent toward a destination airport is carried out with constant Mach number and speed, values which may be adapted according to the type of aircraft A. A correction may be applied as a function of the mass of the aircraft A.

In this case, the compatibility of this strategy with respect to the fuel consumption and with respect to overflying obstacles should also be verified, because this strategy applies the maximum altitude of the aircraft A, while waiting for the pilot to make a decision, which may take several minutes.

It will be furthermore noted that the calculations implemented by said means 11 may require intermediate calculations, which are carried out in a usual manner by the airlines and the aircraft manufacturers, and which may be incorporated into an FMS (Flight Management System) in such a manner as to obtain parameters such as:

a maximum flight level with one engine inoperative;
an LRC flight level or ceiling;
an LRC Mach number or speed.

All these calculations may be carried out using tables (or polynomial approximations) having, at the input:

variables such as the mass of the aircraft A, the external temperature, the type of the aircraft A and/or the altitude; and/or parameters fixed or modifiable by the airline.

Figure 2:
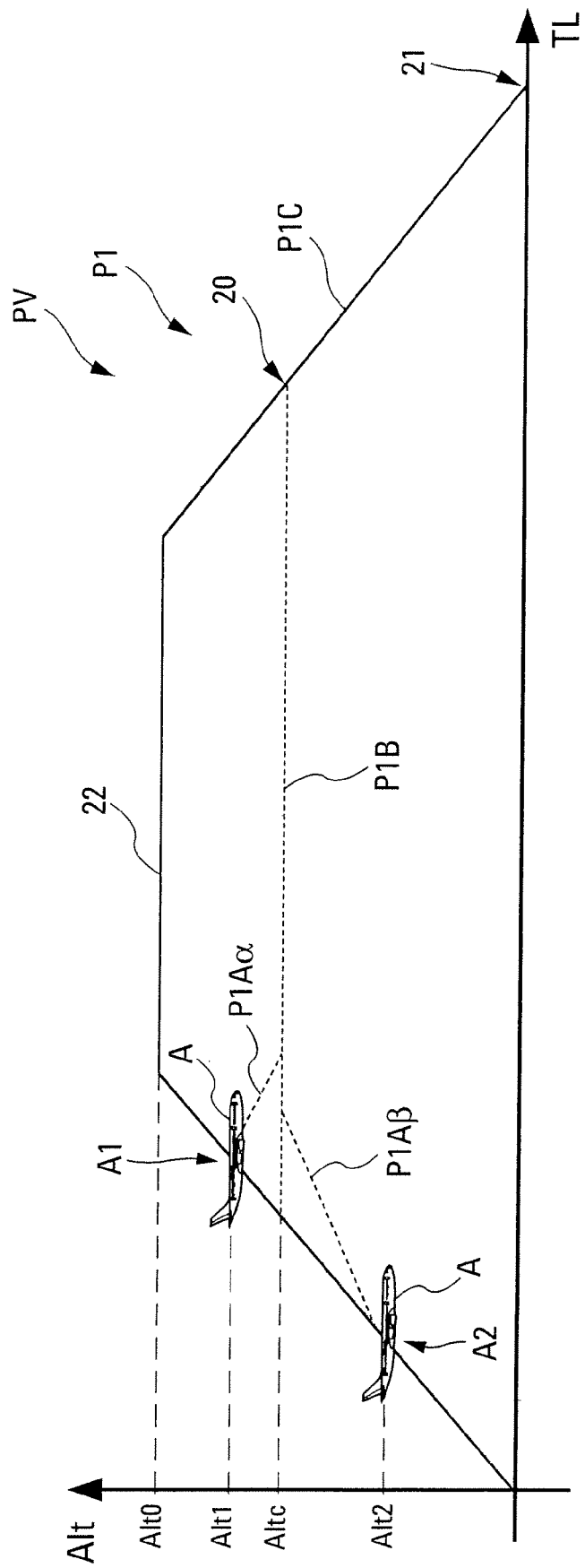
FIG. 2 is a graphical representation illustrating a flight profile that may be followed by an aircraft within the framework of the present invention.

In a preferred embodiment, the means 11 comprise elements (not shown) allowing the following steps to be respectively implemented with the aim of determining the vectoring settings (speed, thrust and altitude settings) allowing the aircraft A to fly to the destination airport, in accordance with a flight strategy received from the means 7:

c1) calculate a setpoint altitude Altc which is characteristic of said flight strategy. It can vary as a function of the variation over time of the mass of the aircraft A and of the external temperature parameters;

c2) calculate at least one speed parameter which is also characteristic of this flight strategy;

c3) compare the effective altitude Alt1, Alt2 of the aircraft A when the engine failure occurs with said altitude Altc which is characteristic of said flight strategy and, depending on the result of this comparison, determine first speed, thrust and altitude settings allowing the aircraft A to fly to said setpoint altitude Altc following a first flight profile P1Aα, P1Aβ, as shown in FIG. 2 which illustrates the altitude Alt along the lateral trajectory TL allowing the destination airport to be reached.

c4) when the aircraft A has reached this characteristic altitude Altc, using said speed parameter, determine second speed, thrust and altitude settings corresponding to cruising flight at said setpoint altitude Altc, along the lateral trajectory TL as far as a point of descent 20, as illustrated in the form of a second flight profile P1B in FIG. 2;

c5) when the aircraft A is situated at a pre-determined distance from the destination airport (at said point of descent 20), determine third speed, thrust and altitude settings allowing the aircraft A to fly according to a third profile P1C corresponding to a descent profile from the setpoint altitude Altc toward this destination airport (situated at a point 21).

Said first, second and third speed, thrust and altitude settings form said vectoring settings sought. In FIG. 2, the flight level 22 (altitude Alt0) is also shown situated at the origin (in the absence of engine failure).

The preceding step c3 can comprise two different variants, namely:

c3A) if the effective altitude Alt1 of the aircraft A at the time of the failure (at the position A1) is higher than said characteristic altitude Altc, determine first speed, thrust and altitude settings allowing the aircraft A to descend down to said setpoint altitude Altc following a first flight profile P1Aα, as shown in FIG. 2; and c3B) if the effective altitude Alt2 of the aircraft A at the time of the failure (at the position A2) is lower than said setpoint altitude Altc, determine first speed, thrust and altitude settings allowing the aircraft A to climb to said setpoint altitude Altc following a first flight profile P1Aβ, as also shown in FIG. 2.

Hereinafter, the steps c1; c2, c3A, c3B, c4 and c5 are presented for each of the three following strategies:

the standard strategy (strategy S1);
the obstacle clearance strategy (strategy S2); and
the strategy with minimum flight time (strategy S3).

For each of these steps, the altitude (or flight level), speed and thrust settings, associated with each flight strategy, are presented:

*Step c1: determination of the setpoint altitude:

strategy S1: LRC ceiling which corresponds to a maximum flight level which is defined, in a usual manner, notably as a function of the mass of the aircraft A and of the external temperature, preferably using a pre-determined table;

strategy S2: flight ceiling which corresponds to a maximum altitude which is defined, in a usual manner, as a function of the mass of the aircraft A and of the external temperature. This flight ceiling is determined, preferably, using a pre-determined table;

strategy S3: cruising altitude with one engine inoperative: pre-determined value, in the neighborhood of 17,000 feet (around 5000 meters);

*Step c2: determination of the speed parameter:

strategy S1: LRC (Long-Range Cruise) Mach number or speed with two options:
  LRC speed calculated based on a cost index which is specific to an engine failure and which is appropriate to the type of aircraft A; or
  LRC Mach number and speed determined as a function of the LRC ceiling, of the mass and of temperature and preferably formed from a pre-determined table;

strategy S2: optimum slope speed with one engine inoperative (or Gdot speed) which is a function of the mass and of the altitude and which is preferably formed using a pre-determined table;

strategy S3: cruising speed or Mach number ("M") with one engine inoperative: M0.82/310 kt, where kt represents a knot corresponding to 0.514 m/s;

*Step c3A: determination of the descent profile:

strategy S1: the objective flight level corresponds to the LRC ceiling; select Mach 0.82 then speed 300 kt except if the vertical speed is less than 500 ft/min, in which case select a rate of descent of 500 ft/min with a speed set accordingly; for the thrust, select an MCT (Maximum Continuous Thrust), which corresponds to the level of thrust generally applied to the motor(s) remaining operational, except during the last phase of descent toward an airport;

strategy S2: the objective flight level corresponds to the flight ceiling, the objective speed corresponds to the Gdot speed and the objective thrust corresponds to the MCT;

strategy S3: the objective flight level corresponds to the cruising altitude with one engine inoperative except if the vertical speed is less than 500 ft/min, in which case select a rate of descent of 500 ft/min with a speed set accordingly, the objective speed is equal to M0.82/310 kt, and the objective thrust is equal to the MCT;

*Step c3B: determination of the climb profile:

strategy S1: the objective flight level corresponds to the LRC ceiling, select Mach 0.82 then speed 300 kt; for the thrust, select the MCT;

strategy S2: the objective flight level corresponds to the flight ceiling, the objective speed corresponds to the Gdot speed and the objective thrust corresponds to the MCT;

strategy S3: the objective flight level corresponds to the cruising altitude with one engine inoperative, the objective speed is equal to M0.82/310 kt, and the objective thrust is the MCT;

*Step c4: cruising flight:

strategy S1: LRC flight level, LRC flight speed, thrust level MCT. The LRC flight level can change in the course of the flight since it depends on the mass and on the temperature both of which vary over time;

strategy S2: the objective flight level corresponds to the flight ceiling, the objective speed corresponds to the Gdot speed, and the objective thrust corresponds to the MCT;

strategy S3: cruising speed—one engine inoperative, flight speed M0.82/310 kt, thrust level MCT;

*Step c5: descent:

strategy S1: select Mach 0.82, then speed 300 kt, except if the vertical speed is less than 500 ft/min, in which case select a rate of descent of 500 ft/min with a speed set accordingly; for the thrust, select the idling level with an additional margin;

strategy S2: select Mach 0.82, then speed 300 kt, except if the vertical speed is less than 500 ft/min, in which case select a rate of descent of 500 ft/min with a speed set accordingly; for the thrust, select the idling level with an additional margin;

strategy S3: select Mach 0.82, then speed 300 kt, except if the vertical speed is less than 500 ft/min, in which case select a rate of descent of 500 ft/min with a speed set accordingly; for the thrust, select the idling level with an additional margin.

Furthermore, in a preferred embodiment, the processing unit 6 transmits to said system 13 only the vectoring settings that have first been presented on a display screen 15 (which is connected by a link 16 to the processing unit 6) and validated by an operator, in particular the pilot of the aircraft A, using a validation means 17 that may be actuated and which is connected via a link 18 to said processing unit 6. In addition, the device 1 can also comprise means (not shown) allowing the pilot to generate, at any time, other more appropriate settings, in particular as a result of instructions given by air traffic controllers. These settings may be superimposed onto the automatic flight control implemented by the device 1 or may replace it. This allows the pilot to remain in full control of the maneuver implemented as a result of an engine failure.

In addition, the device 1 according to the invention may also comprise means (not shown) allowing the following features to be implemented:

the aforementioned numerical values are able to be adapted by the airline, as a function of the type of the aircraft A and of financial criteria specific to this airline. The adaptation is carried out by storing the parameters in a database (not shown) which is situated on board the aircraft A, and which the device 1 can access via suitable means (not shown);

the aforementioned numerical values may be modified at any time by the crew of the aircraft A, using appropriate means (not shown) which are situated within the cockpit of said aircraft A; and the flight strategy to be followed by the aircraft A is calculated directly by means (not shown) of said device 1.

The invention claimed is:

1. A method for assisting in the management of an engine failure on a multi-engine aircraft, according to which method the engines of said aircraft are monitored during a flight in such a manner as to be able to detect the engine failure, wherein, when the engine failure is detected during the flight, the method comprises automatically carrying out the following series of successive steps:

a) determining current values of parameters relating to flight conditions of the aircraft, together with values of basic parameters of the aircraft;

b) generating a flight strategy which is configured to be applied to the aircraft to enable the aircraft to fly to a destination airport;

c) determining, using said current values and values determined in step a) and said flight strategy, vectoring settings comprising speed, thrust and altitude settings which are configured to be implemented on the aircraft so as to enable the aircraft to fly to said destination airport; and d) transmitting the speed, thrust and altitude settings to a system configured to automatically implement the speed, thrust and altitude settings on the aircraft, wherein said flight strategy is a strategy selected by an operator or, when is no selection, a default strategy, wherein step c) further comprises, in order to determine said vectoring settings, carrying out the following operations:

c1) calculating an altitude which is characteristic of the flight strategy;

c2) calculating at least one speed parameter which is characteristic of said flight strategy;

c3) comparing an effective altitude of the aircraft when the engine failure occurs with the altitude which is characteristic of the flight strategy and, depending on a result of the comparison, determining first speed, thrust and altitude settings to enable the aircraft to reach said characteristic altitude;

c4) determining second speed, thrust and altitude settings to enable the aircraft to follow a cruising flight at said characteristic altitude toward said destination airport using said at least one speed parameter; and c5) determining third speed, thrust and altitude settings to enable the aircraft to descend in order to land at said destination airport, wherein said first, second and third speed, thrust and altitude settings form said vectoring settings, and wherein the default strategy is stored in a database and comprises an obstacle clearance strategy which enables the altitude of the aircraft to be maximized.

2. The method as claimed in claim 1, wherein said parameters relating to the flight conditions comprise at least the speed and the altitude of the aircraft.

3. The method as claimed in claim 1, wherein said basic parameters comprise at least the mass and the type of the aircraft and the external temperature.

4. The method as claimed in claim 1, wherein step b) comprises generating one of the following flight strategies:

a standard strategy which comprises flying the aircraft so as to minimize fuel consumption;

a strategy with minimum flight time which comprises flying the aircraft at a highest possible speed; and the obstacle clearance strategy which comprises flying the aircraft as high as possible.

5. The method as claimed in claim 1, wherein step d) further comprises only transmitting the vectoring settings that have been validated beforehand using a validation unit which is configured to be actuated by an operator.

6. A device for assisting in the management of an engine failure on a multi-engine aircraft, said device comprising a first unit to automatically detect, during a flight of the multi-engine aircraft, a failure of an engine of said aircraft, wherein said device additionally comprises:

a second unit to automatically determine, when the engine failure is detected by said first unit, current values of parameters relating to flight conditions of the aircraft, together with values of basic parameters of the aircraft;

a third unit to automatically generate a flight strategy configured to be applied to the aircraft to enable the aircraft to fly to a destination airport;

a fourth unit to automatically determine, using said current values and values determined by said second unit and said flight strategy generated by said third unit, vectoring settings comprising speed, thrust and altitude settings configured to be implemented on the aircraft so as to enable the aircraft to fly to said destination airport; and a fifth unit to automatically transmit said speed, thrust and altitude settings to a system configured to automatically implement the speed, thrust and altitude settings on the aircraft, wherein said flight strategy is a strategy selected by an operator or, when there is no selection, a default strategy, wherein, in order to determine said vectoring settings, the fourth unit is further configured to:

calculate an altitude which is characteristic of the flight strategy;

calculate at least one speed parameter which is characteristic of said flight strategy;

compare an effective altitude of the aircraft when the engine failure occurs with the altitude which is characteristic of the flight strategy and, depending on a result of the comparison, determine first speed, thrust and altitude settings to enable the aircraft to reach said characteristic altitude;

determine second speed, thrust and altitude settings to enable the aircraft to follow a cruising flight at said characteristic altitude toward said destination airport using said at least one speed parameter; and determine third speed, thrust and altitude settings to enable the aircraft to descend in order to land at said destination airport, wherein said first, second and third speed, thrust and altitude settings form said vectoring settings, and wherein the default strategy is stored in a database and comprises an obstacle clearance strategy which enables the altitude of the aircraft to be maximized.

7. The device as claimed in claim 6, wherein said device additionally comprises a selection unit configured to enable an operator to select the flight strategy.

8. The device as claimed in claim 6, wherein said device additionally comprises said system configured to automatically implement said speed, thrust and altitude settings.

9. An aircraft, comprising a device assisting in the management of an engine failure on a multi-engine aircraft, said device comprising a first unit to automatically detect, during a flight of the multi-engine aircraft, a failure of an engine of said aircraft, wherein said device additionally comprises:

- a second unit to automatically determine, when the engine failure is detected by said first unit, current values of parameters relating to flight conditions of the aircraft, together with values of basic parameters of the aircraft;
- a third unit to automatically generate a flight strategy configured to be applied to the aircraft to enable the aircraft to fly to a destination airport;
- a fourth unit to automatically determine, using said current values and values determined by said second unit and said flight strategy generated by said third unit, vectoring settings comprising speed, thrust and altitude settings configured to be implemented on the aircraft so as to enable the aircraft to fly to said destination airport; and
- a fifth unit to automatically transmit said speed, thrust and altitude settings to a system configured to automatically implement the speed, thrust and altitude settings on the aircraft, wherein said flight strategy is a strategy selected by an operator or, when there is no selection, a default strategy, wherein, in order to determine said vectoring settings, the fourth unit is further configured to:

calculate an altitude which is characteristic of the flight strategy;

calculate at least one speed parameter which is characteristic of said flight strategy;

compare an effective altitude of the aircraft when the engine failure occurs with the altitude which is characteristic of the flight strategy and, depending on a result of the comparison, determine first speed, thrust and altitude settings to enable the aircraft to reach said characteristic altitude;

determine second speed, thrust and altitude settings to enable the aircraft to follow a cruising flight at said characteristic altitude toward said destination airport using said at least one speed parameter; and determine third speed, thrust and altitude settings to enable the aircraft to descend in order to land at said destination airport, wherein said first, second and third speed, thrust and altitude settings form said vectoring settings, and wherein the default strategy is stored in a database and comprises an obstacle clearance strategy which enables the altitude of the aircraft to be maximized.

* * * * *